US009885874B2

(12) United States Patent
Yun et al.

(10) Patent No.: US 9,885,874 B2
(45) Date of Patent: Feb. 6, 2018

(54) MICROLENS ARRAY AND METHOD FOR FABRICATING THEREOF

(71) Applicant: ELECTRONICS AND TELECOMMUNICATIONS RESEARCH INSTITUTE, Daejeon (KR)

(72) Inventors: Sung-Ryul Yun, Daejeon (KR); Ki-Uk Kyung, Seoul (KR); Sun-Tak Park, Daejeon (KR); Bong-Je Park, Daejeon (KR); Sae-Kwang Nam, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 93 days.

(21) Appl. No.: 14/246,485

(22) Filed: Apr. 7, 2014

(65) Prior Publication Data
US 2015/0043067 A1    Feb. 12, 2015

(30) Foreign Application Priority Data

Aug. 12, 2013   (KR) ........................ 10-2013-0095215

(51) Int. Cl.
*G02B 27/22* (2006.01)
*G02B 26/08* (2006.01)
*G02B 3/00* (2006.01)

(52) U.S. Cl.
CPC ..... *G02B 27/2214* (2013.01); *G02B 26/0875* (2013.01); *G02B 3/005* (2013.01); *G02B 3/0043* (2013.01); *Y10T 29/49155* (2015.01)

(58) Field of Classification Search
CPC . G02B 3/0006–3/0075; G02B 27/2214; G02B 26/0875; G02B 26/004;
(Continued)

(56) References Cited

U.S. PATENT DOCUMENTS

| 5,493,427 A * | 2/1996 | Nomura ................. G02B 3/005 348/59 |
| 2007/0091037 A1 * | 4/2007 | Lee ..................... G02B 26/0875 345/84 |

(Continued)

FOREIGN PATENT DOCUMENTS

| KR | 10-2008-0043610 A | 5/2008 |
| KR | 10-2009-0033454 A | 4/2009 |
| KR | 10-2011-0118731 A | 10/2011 |

*Primary Examiner* — Marin Pichler
(74) *Attorney, Agent, or Firm* — Rabin & Berdo, P.C.

(57) ABSTRACT

A microlens array and a method for fabricating thereof are provided. The microlens array of the present invention comprises a lens structure part formed by bistable dielectric polymer thin film; first and second electrode parts each formed on the upper surface and the bottom surface of the lens structure part to apply voltage for shape changes of the lens structure part; a circuit part applying heat to the dielectric polymer thin film to change the property of the dielectric polymer thin film to be soft; and a base part formed on the bottom surface of the second electrode in predetermined intervals. The method further comprises a hydraulic part to apply predetermined voltage to the bottom surface of the lens structure part. The microlens array is thus able to change optical properties by deform the shape of a transparent dielectric polymer thin film having bistablity to various sizes of lens shapes by the purposes.

18 Claims, 4 Drawing Sheets

(58) Field of Classification Search
CPC .. G02B 26/005; G02B 15/00; G02B 27/0961; Y10T 29/49155
USPC .......................................... 359/619–628, 666
See application file for complete search history.

(56) References Cited

U.S. PATENT DOCUMENTS

| | | | |
|---|---|---|---|
| 2011/0062635 A1* | 3/2011 | Crosby .................. | B29C 53/02 264/447 |
| 2012/0026159 A1* | 2/2012 | Seok .................. | H04N 13/0404 345/419 |
| 2012/0261551 A1* | 10/2012 | Rogers .................... | G02B 3/14 250/208.1 |
| 2012/0293735 A1* | 11/2012 | Jung .................. | G02B 27/2214 349/15 |

* cited by examiner (a)

(b)

(a)  (b)

(a)  (b)

MICROLENS ARRAY AND METHOD FOR FABRICATING THEREOF

CROSS-REFERENCE TO RELATED APPLICATIONS

This application claims the benefit of Korean Patent Application No. 10-2013-0095215, filed with the Korean Intellectual Property Office on Aug. 12, 2013, the disclosure of which is incorporated herein by reference in its entirety.

BACKGROUND

1. Technical Field

The present disclosure relates to a microlens array, more particularly to a microlens array which is able to change optical properties by deforming the shape of a transparent dielectric polymer thin film having bistablity to various sizes of lens shapes by the purposes, and a method for fabricating thereof.

2. Background Art

Not only high resolution screens but also virtual screens or 3D images have been provided with ongoing developments in display technologies which are used for mobile terminals, projectors and TVs that are currently available. Virtual screen technology uses a projection method based on a laser light source, a micromirror array, and a microlens array, and 3D image technology uses a stereoscopic method which creates images in 3 dimensions by means of perception of depth caused by binocular image disparity. However, since both technologies create 3D images with front perception of depth, there are technical limitations such that 3D images are significantly different depending on the viewing angle and it causes fatigue of viewer's eyes and dizziness of viewer.

Currently, it is essential to use microlens arrays appropriately designed for each application in order to implement projections, virtual screens or 3D images similar to actual images on various electronic devices. Passive lens layers with a constant standard have been used depending on their uses. In general, the passive lens layer is manufactured through various methods such as laser guided dry etching, photolithography using diffuser, laser chemical vapor deposition and FIB (focused ion beam) milling, etc. Recently, methods using reflow phenomenon of polymer materials and imprinting using PDMS mold and UV curing polymers are used to simplify the process and reduce cost for manufacturing microlens arrays.

However, such methods have still difficulties in manufacturing microlens array having ensured flexibility and desired material properties and further, since lens factors are fixed, it cannot perform various functions depending on the purpose of a user on a single electronic device.

Conventional technologies relating to a microlens array are described below.

KR Pub No. 10-2009-0033454 discloses a microlens sheeting using a shape memory material. When the sheeting is heated to a temperature above the transition temperature (Tg) of the shape memory material, it is physically deformed in a flat shape.

It is a display apparatus technology controlling a focal distance through lens shape changes. It has some drawbacks such that it is hard to implement in a single layer structure since a shape is deformed by applying heat to a lens layer using a heat applying sheeting; it is difficult to control the focal distance of the lens more than one step since the lens shape is deformed in a flat shape only when the sheeting is heated to a temperature above the transition temperature (Tg); it is difficult to change optical properties of individual lens or a part of the lens on the microlens array; and it has a difficult structure to change optical angle among the optical properties. In addition, since the lens shape is deformed only with heat application, there is limitation in terms of responding rate of the lens when heat transfer rate is considered.

KR Pub. No. 10-2008-0043610 discloses a method forming microlens by placing a mixture of a polymer and a liquid crystal on the display panel where images are displayed and arranging the mixture according to electric signals.

Even though various shapes of lenses which provide 3D images can be prepared by varying arrangements of the mixture of the polymer and the liquid crystal according to electric signals, dynamic control in a lens shape which is prepared during the process is not possible since the polymer becomes hardened due to UV irradiation, and 2D/3D display conversion becomes difficult.

KR Pub. No. 10-2011-0118731 discloses a method for manufacturing a microlens array which is protruded in a hemispherical shape from a surface, the method including a resist layer forming process, a reflow process and an etching process using a mixed gas of hydrogen-containing molecules and fluorine-containing molecules. It allows easy control in height of the microlens during the manufacturing process to improve a light collection efficiency and satisfy various requirements.

However, it also has a drawback such that it does not allow dynamic control in a lens shape produced during the manufacturing process, resulting in difficulties in appropriate changes of lens factors.

SUMMARY

The present disclosure relates to a microlens array which is able to change optical properties by deforming the shape of a transparent dielectric polymer thin film having bistablity to various sizes of lens shapes by the purposes, and a method for fabricating thereof, so as to resolve the problems associated with the conventional technologies.

The present disclosure also relates to a microlens array which is able to selectively perform various functions such as projections, virtual displays and 3D images with the same lens structure since any deformed lens shape can be solidified using bistablity properties of the lens material of the present invention, and a method for fabricating thereof.

The present disclosure also relates to a microlens array which is able to prevent display distortions and image switches between 2D and 3D, and a method for fabricating thereof.

In order with at least one embodiment, a microlens array is provided. The microlens array includes a lens structure part formed by bistable dielectric polymer thin film; first and second electrode parts each formed on the upper surface and the bottom surface of the lens structure part, respectively, to apply voltage for shape changes of the lens structure part; a circuit part applying heat to the dielectric polymer thin film to change the property of the dielectric polymer thin film to be soft; and a base part formed on the bottom surface of the second electrode in predetermined intervals to support the lens structure part.

The microlens array of the present disclosure may further include a hydraulic part to apply a predetermined pressure to the bottom surface of the lens structure part.

The lens structure part may be formed with a shape memory polymer and the first and second electrode parts may be formed with one chosen from carbon nanotube, silver nanowire, graphene and Indium tin oxide (ITO).

The degree of deformation in shapes of the lens structure part may be controlled according to the voltage magnitude applied through the first and second electrode parts.

At least one of the first electrode part and the second electrode part may form a plurality of electrode parts by being patterned in a predetermined shape. The plurality of electrode parts may have independent electrode structures to apply different magnitudes of voltages.

The microlens array of the present disclosure may further comprise a light source structure part being coupled to the bottom surface of the base part to irradiate light to the lens structure part.

The light source structure part may comprise a light source irradiating light, in which the light source is formed between the base part or on the bottom surface of the base part.

The light source structure part may comprise: a light source formed on the bottom surface of the base part; a micromirror formed between the base part; and an optical waveguide forming a light transmitting path to transmit the light of the light source to the micromirror.

A method for fabricating a microlens array according to an embodiment of the present disclosure may comprise: forming a lens structure part formed by bistable dielectric polymer thin film; forming first and second electrode parts on the upper surface and the bottom surface of the lens structure part, respectively to apply voltage for shape changes of the lens structure part; forming a circuit part on a part of the upper surface of the first electrode part or a part of the bottom surface of the second electrode part to apply heat to the dielectric polymer thin film; and forming a base part on the bottom surface of the second electrode in predetermined intervals to support the lens structure part.

In the forming the lens structure part, the lens structure part may be formed in a three-dimensional shape or a flat shape.

According to the present disclosure, a transparent dielectric polymer thin film having bistablity can be deformed to various sizes of lens shapes by the purpose to change optical properties and the deformed lens shape can be solidified using the bistablity of the lens material to perform multifunctions selectively such as projection, virtual display and 3D image, etc. with the same lens structure.

In addition, according to the present disclosure, a lens shape can be implemented or a lens shape can be deformed into various shapes in real time through applying heat and voltage to the flexible thin layer so that it allows preventing display distortion during projection, being 2D/3D image switchable, and providing selectively in a virtual display or in a 3D image at the same structure.

According to the present disclosure, a microlens shape can be deformed into various structures through applying heat and voltage so that it allows controlling a lens focal distance on the thin film structure and changing an optical angle without requiring an additional driving part.

Therefore, the present disclosure is applicable for various displays with a variety of appropriate managements.

For example, when the microlens of the present disclosure is used to an existing electronic devices or flexible electronic devices, it is able to provide flat panel display without distortion, regardless of the shape of the display surface during the projection, perform a variety of functions such as reduction/enlargement of a specific part on the display screen, and provide realistic 3D display to a flexible device through lens shape changes.

DETAILED DESCRIPTION

Hereinafter, a microlens array according to embodiments of the present invention and a method for fabricating the same will be described in detail with reference to the accompanying drawings. The necessary part to understand behaviors and functions according to the present invention will be described in more detail.

It will be understood that constitutional parts having identical names may be assigned with different reference numbers according to the Figures or assigned with identical reference numbers despite Figure numbers are different. However, it does not mean that each constitutional part has different characteristic function according to embodiments or has identical characteristic function in different embodiments so that the function of each constitutional part will be determined based on the description of each constitutional part in the corresponding embodiments.

The present disclosure is to provide a microlens array having variable optical properties by using a microlens shape fabricated by a transparent, flexible and bistable dielectric polymer thin film or by fabricating a desired lens shape through the initial deformation caused by external stimuli after making a flat structure.

According to the present disclosure, it is able to implement various shapes of lenses in real time by applying heat on the entire or a part of a polymer thin film through a transparent flexible electrode formed on the bistable dielectric polymer thin film having a microlens shape to modify the property of the dielectric polymer thin film to be soft, and then applying external stimuli, particularly voltage.

Furthermore, it is able to implement various shapes of lenses by applying heat a bistable polymer thin film on a flat surface in the above method to modify the property of the dielectric polymer thin film to be soft and then applying external stimuli, particularly voltage or pressure through fluid or air flow to the bottom surface of the thin film.

Here, it also allows controlling a focal distance and/or an optical angle depending on the purpose and/or convenience of user's through controlling the size of the lens so that it may selectively provide projection display, virtual display or 3D image, be combined to flexible devices and be multifunctionalized.

Figure 1:
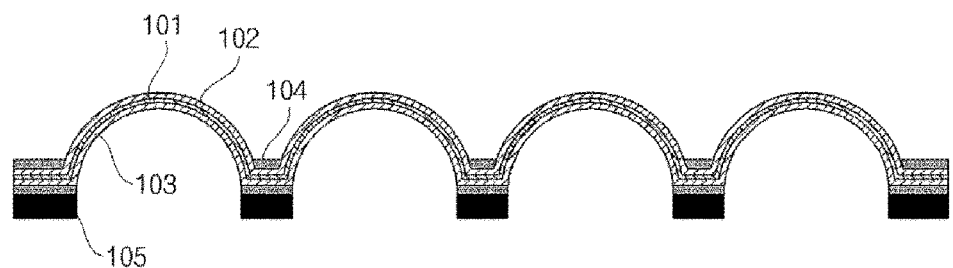
FIG. 1 is a sectional view of a microlens array according to an embodiment of the present invention.

FIG. 1 is a sectional view of a microlens array according to an embodiment of the present invention.

Referring to FIG. 1, a microlens array of the present invention comprises a lens structure part 101, first and second electrode parts 102, 103, a circuit part 104 and a base part 105.

The lens structure part 101 is formed with a bistable dielectric polymer thin film in a lens shape.

It is apparent that the lens structure part 101 use a shape memory polymer which has bistability and dielectric properties. The shape memory polymer having such properties may be any material usable for forming the lens structure part, particularly poly(tert-butyl acrylate) (PTBA) but it is not limited thereto.

Physical properties of the lens structure part 101 can be changed to the soft property to deform the shape of the lens structure part 101 due to the bistable characteristics of the lens structure part when heat is applied to the upper surface or the bottom surface of the lens structure part 101 through the current applied through first and second electrode parts 102, 103 coated over the upper surface and the bottom surface and the circuit part 104 connected to the upper surface of the base part 105.

It means that the degree of deformation of the lens structure part 101 can be controlled according to the voltage magnitude applied through the first and second electrode parts 102, 103.

The first and second electrode parts 102, 103 are formed on the upper surface and the bottom surface of the lens structure part 101, respectively, and applies voltage to deform the shape of the lens structure part 101.

It is apparent that the first and second electrode parts 102, 103 use nanomaterial having excellent flexibility, elasticity and transparency and may be formed with one chosen from carbon nanotube, silver nanowire, graphene and Indium tin oxide (ITO). However, any material used for other electrodes can be used for the first and second electrode parts 102, 103 without limitation.

Furthermore, either one of the first and second electrode parts 102, 103 can be patterned in a predetermined shape to form a plurality of electrode parts.

Here, the plurality of electrode parts may have independent electrode structures and different magnitudes of voltages may be applied to each electrode.

As such, when one electrode part of the first and second electrode parts 102, 103 is patterned as a plurality of electrode parts, it is possible to apply heat with different temperature or voltage with different magnitude by area from individual electrode part to provide a variety of shapes of the lens structure part.

The circuit part 104 functions to change the property of the dielectric polymer thin film to be soft by applying heat to the dielectric polymer thin film of the lens structure part 101.

Here, the circuit part 104 can be electrode-patterned to apply heat to the lens structure part 101 on the upper surface or the bottom surface of the lens structure part 101 according to convenience for manufacturing the microlens array. Particularly, when voltage is applied between the first and the second electrode parts 102, 103, which are formed on the upper surface and the bottom surface of the lens structure part 101, respectively, to deform the shape of the lens structure part 101, the circuit part 104 can serve as a ground for applying voltage.

It is apparent that the circuit part 104 be configured in an independent area not to cause optical interference while changing the optical properties of the lens structure part 101.

The position where the circuit part 104 is to be formed is variable depending on the design.

Here, the circuit part 104 can be formed by using the same material of the first and second electrode parts or other metal electrode materials.

The base part 105 is configured to support the microlens array and formed on the bottom surface of the second electrode 103 in predetermined intervals. The position where the base part 105 can be formed may be similar to that where the circuit part 104 is formed.

Here, it is apparent that the base part 105 be flexible and transparent polymer material, but it can be also inflexible or non-transparent depending on the purpose of applications of the microlens array having variable optical properties.

FIG. 1 shows the case that the lens structure part is designed in a lens shape. The microlens array of one embodiment is not necessary to be designed only in a 3-dimension such as the lens shape, but may be designed in a flat shape as shown in FIG. 2.

Figure 2:
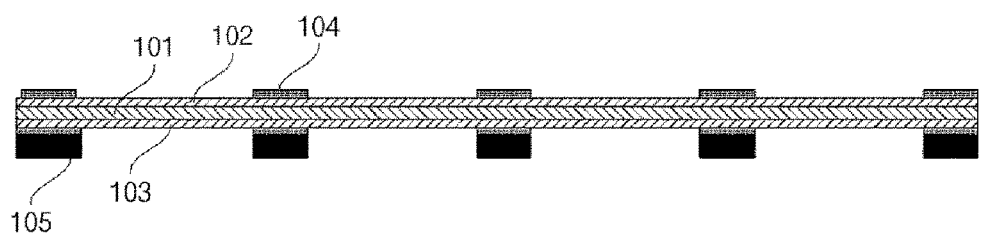
FIG. 2 is a sectional view of a microlens array according to another embodiment of the present invention.

As shown in FIG. 2, the microlens array according to one embedment of the present invention may include the lens structure part 101 having a 2D flat shape.

First and second electrode parts 102, 103, a circuit part 104 and a base part 105 in FIG. 2 may have the same functions of the first and second electrode parts 102, 103, the circuit part 104 and the base part 105 in FIG. 1.

Figure 3:
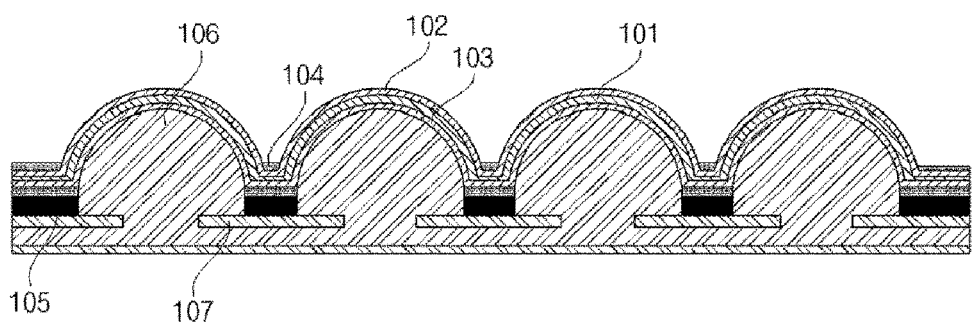
FIG. 3 is a sectional view of a microlens array according to further another embodiment of the present invention.
Figure 4:
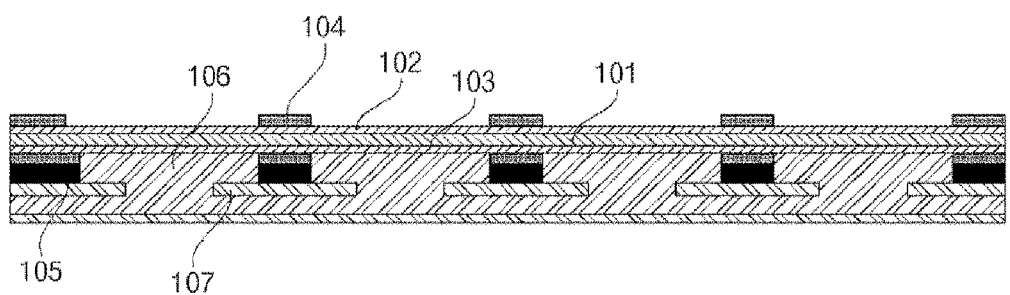
FIG. 4 is a sectional view of a microlens array according to further another embodiment of the present invention.

Furthermore, as shown in FIG. 3 and FIG. 4, the microlens array of the present invention may further include a hydraulic part 106 at the bottom part of the microlens array in FIG. 1 and FIG. 2

The hydraulic part 106 applies pressure on the upper surface of the lens structure part 101 using fluid or air layer, can be designed as a micro-fluid channel 107 formed of a flexible polymer material and can be also designed to apply the same or different pressure to the bottom surface of each microlens array.

The hydraulic part 106 may also prevent from sagging of the curved surface or changing the curved surface to anfractuous surface which can be caused during the process of changing the physical property of the lens structure part 101 to the soft property by applying heat to the lens structure part 101.

Maintaining the curved surface of the lens structure part 101 while applying heat using the hydraulic part 106 to the equivalent level compared to the level before applying heat, can be helpful to generate reproducible symmetrical deformation by controlling at the curved surface of the lens structure part during applying voltage.

Even though it is not illustrated in FIG. 1 to FIG. 4, the microlens array of the present invention may further include an insulation part to prevent phenomenon of electric discharge which can be caused during applying voltage.

Figure 5:
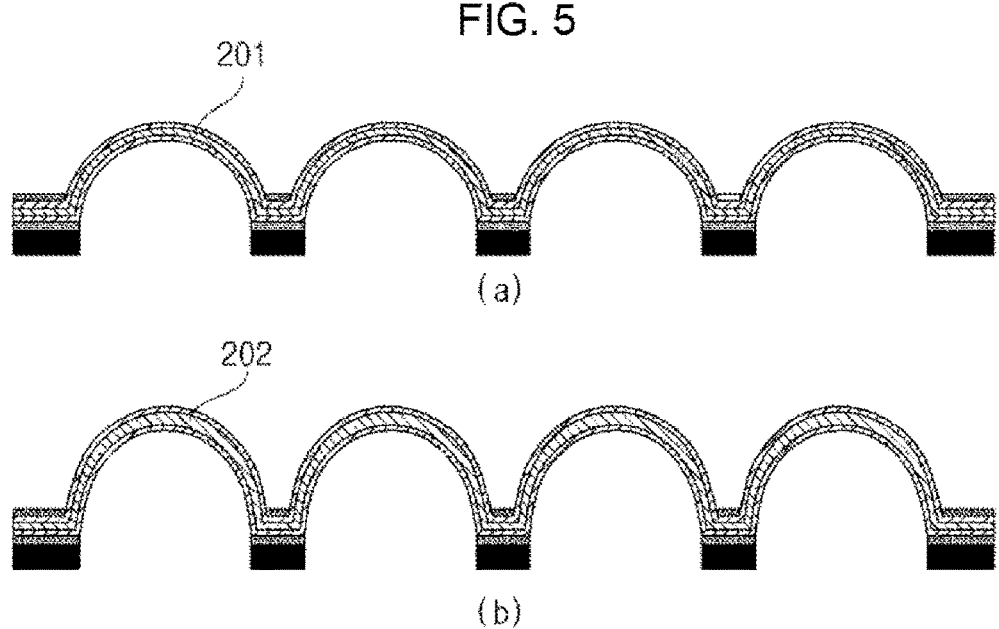
FIG. 5 is an exemplary view according to changes in the shape of the microlens array of the present invention.

FIG. 5 shows an exemplary view according to changes in the shape of the microlens array according to at least one embodiment of the present invention.

As shown in FIG. 5, when current is applied through the first and second electrode parts coated over the upper surface and the bottom surface of the lens structure part in a lens shape and the circuit part 104 connected to the upper surface of the base part, heat is delivered to the upper surface or the bottom surface of the lens structure part to change the physical property of the lens structure part to the soft property due to the bistable characteristics of the lens structure part.

Here, when current is applied through the first and second electrode parts formed on the upper surface and the upper surface of the lens structure part, the lens structure part expands to the curvature direction due to electrostatic force formed in the thickness direction of the lens structure part 201 to provide deformed lens structure part 202.

Since both ends of the lens structure part having lens shape are fixed to the base part, expansion of the lens structure part to the curvature direction may be limited and thus the lens shape may deform into the direction where the radius becomes smaller. The degree of deformation of the lens structure part may vary with the voltage to be applied so that it allows controlling the radius of the lens to various levels which further allows controlling the lens focus and lens factors actively.

Figure 6:
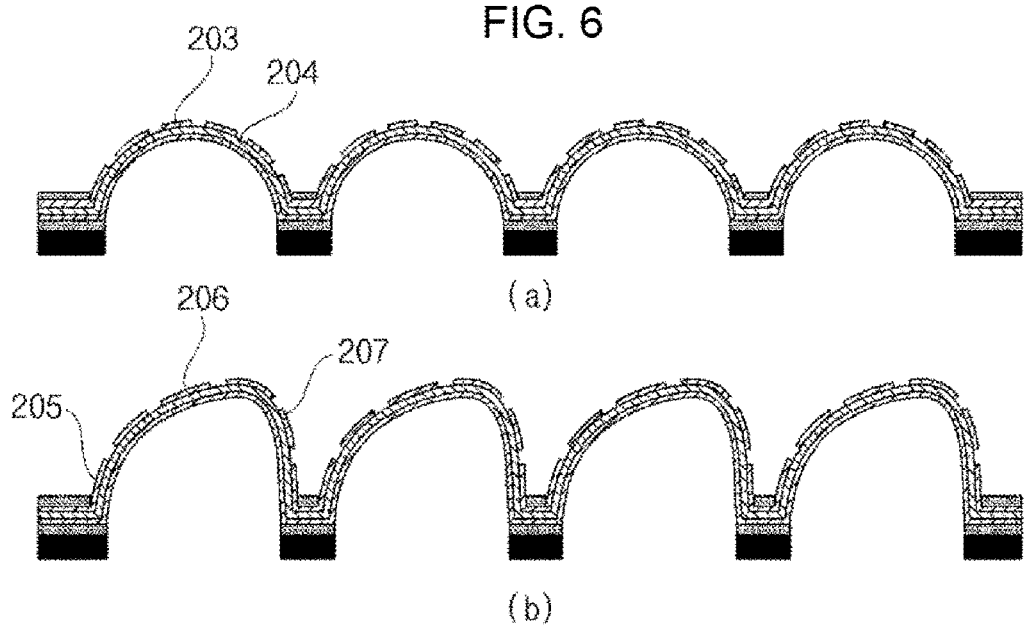
FIG. 6 is another exemplary view according to changes in the shape of the microlens array of the present invention.

FIG. 6 shows another exemplary view according to changes in the shape of the microlens array according to at least one embodiment of the present invention.

As shown in FIG. 6, when one of the first electrode part and the second electrode part is designed to be patterned to the structure having independent areas (electrode area: 203, no electrode area: 204), it is possible to apply heat with different temperature or voltage with different magnitude by area from individual electrode part to provide a variety of shapes of the lens structure part.

For example, when the first electrode part is designed to a plurality of independent electrode parts and different current is applied to each of three areas 205, 206, 207 among them, as shown in FIG. 6*b*, the physical properties of each area of the lens structure part may be different due to heat difference applied in each area.

Here, when the same voltage or different voltage is applied to the plurality of electrode parts, degree of deformation in each area may be different to result the lens shape in an asymmetrical structure due to difference in physical properties of each area of the lens structure part.

The voltage to be applied to the plurality of electrode parts can be independently controlled and thus allows a variety of shapes of the lens structure part and controlling optical angle therethrough.

The lens structure part having the lens shape shown in FIG. 5 and FIG. 6 can be beneficial for the shape deformation and even the lens structure part having a flat or a large radius of curvature can be deformed to allow variable optical properties.

Here, combining the hydraulic part, which prevents from sagging of the curved surface or changing the curved surface to anfractuous surface, to the bottom end of the base part can play a positive role in the structure which implements lenses having various shapes as shown not only FIG. 5 but also FIG. 6.

The lens structure part of the present invention may have different arrangements of the structure depending on the purpose but a plurality of lens shape structures with the arrangement having a constant row and distance between rows is assigned as a basic structure. The shape deformation of the lens structure part can vary with the design of the circuit part such as individual, area-specific or overall shape deformation.

Therefore, any display distortion, which is caused by display screens or various positions, shapes and angles of the surface on which display can be formed, can be reduced or eliminated by applying to various virtual display devices including projection through selectively a part or the entire deformation of the lens shape on the lens structure part.

In addition, when it is applied to 3D display, the position where 3D images will be formed can be controlled and 3D images considered for the shape deformation of objects attached to flexible display devices can be implemented.

Figure 7:
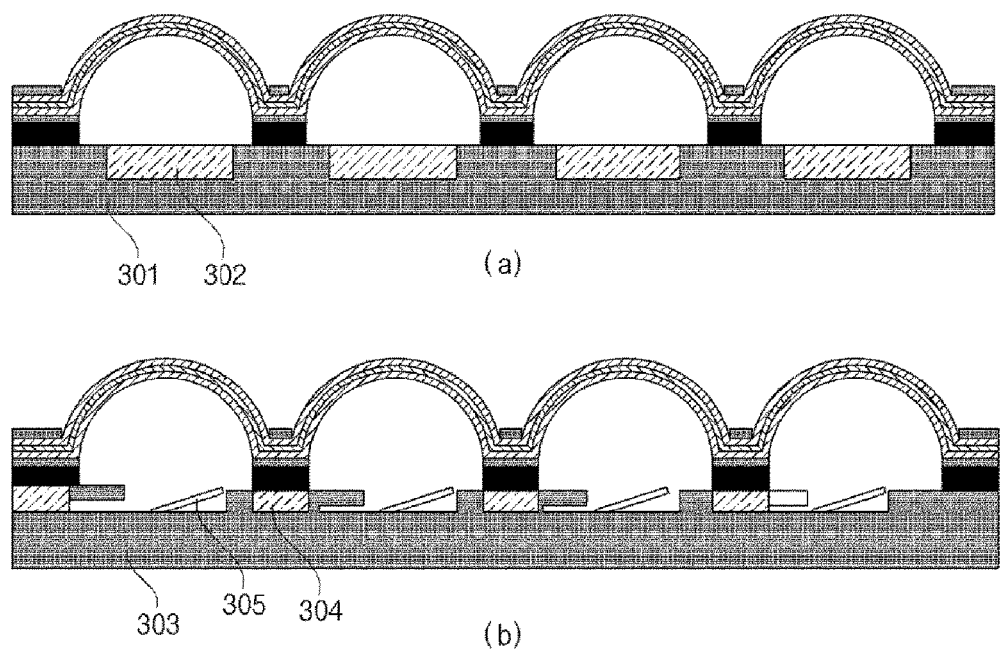
FIG. 7 illustrates detailed configurations including a position of a light source in the microlens array of the present invention.

FIG. 7 illustrates light source position and detail configuration on the microlens array of the present invention including a light source structure part to irradiate light to the microlens array.

As shown in FIG. 7, the microlens array having variable optical properties implements display by using the structure irradiating the light, from the light source combined to the base part, directly to the lens structure part having lens shape (FIG. 7*a*) or irradiating the light, which is generated from the light source combined to the light source structure part and then reflected to a micromirror, to the lens structure part having lens shape (FIG. 7*b*).

In case of FIG. 7*a*, the base part can be formed with rigid materials or soft materials and a light source device 302 can be arranged in the same plane position with the lens structure part having lens shape on the base part. However, it may be advantageous to manufacture the light source device in the shape of an intaglio mold 301 to attach the light source device to correct positions so that it facilitates the arrangement of a plurality of light source devices and a plurality of lens structure parts on the lens array.

Here, the light source device 302 may be a thin-film organic light emitting diode or a chip-type light emitting diode.

In the case of FIG. 7*b*, a light transmitting path including an optical waveguide 303 and a micromirror 305 is formed to transmit the light from the light source device 304 to the microlens, particularly to the lens structure part.

Here, it is apparent that light source device 304 may be a laser diode but it is not limited thereto.

The optical waveguide 303 included in the light transmitting path may be formed by an expose process or micro-molding technology and the micromirror 305 may be designed to be an angle for easy efficient light reflection. Adhesion of metal coating layer or thin-film lens may be advantageous for light reflection.

Figure 8:
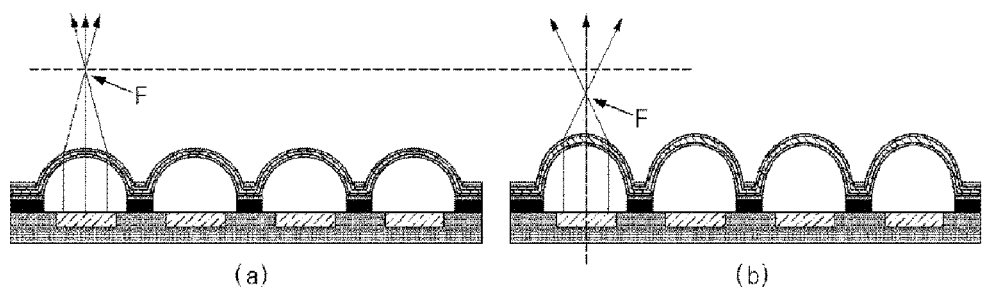
FIG. 8 is an exemplary view illustrating changes of optical properties according to changes in the shape of the microlens structure part of the present invention.
Figure 9:
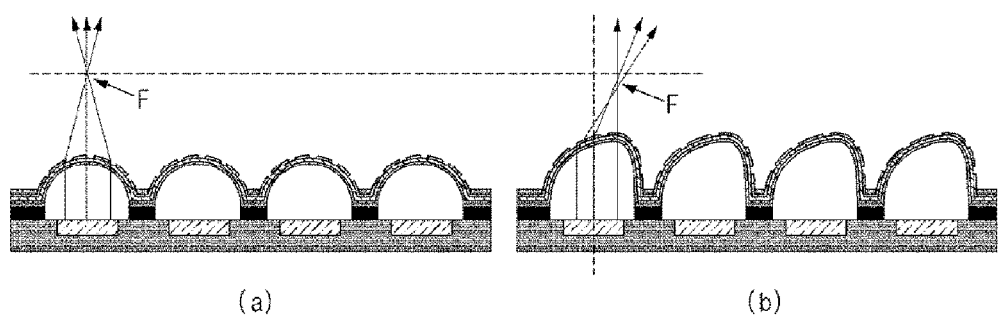
FIG. 9 is another exemplary view illustrating changes of optical properties according to changes in the shape of the microlens structure part of the present invention.

FIG. 8 and FIG. 9 are exemplary views illustrating changes of optical properties according to changes in the shape of the microlens structure part of the present invention, particularly illustrating changes of optical properties of the microlens array through changes in the shape of the microlens structure part.

Referring to FIG. 8 and FIG. 9, when physical shape of the lens structure part having lens shape is deformed from the structure of FIG. 5, focal distance (F) and optical angle of the light irradiated from the light source device of the light source part can be controlled according to the deformed shape. A part or the entire of shape deformation of the lens structure part can be controlled through controlling the voltage applied to each of a plurality of electrode parts in the structure of which the first electrode part in FIG. 6 has a plurality of electrode parts.

In the structure of FIG. 6, not only the focal distance (F) and the optical angle of the light irradiated from the light source device but also focal direction can be controlled.

According to the microlens array of the present invention, the focal distance may be controlled to be shortened when the electrode part is formed on the entire surface of the structure part. Further, the changes in the focal distance and focal position can be controlled when the electrode part is divided into independent areas.

According to the microlens array of the present invention, the focal distance (F) and the optical angle can be changed through changes in the shape of the lens structure part so that the microlens array of the present invention can be applied to projections and virtual displays such as virtual keyboards, virtual instruments, virtual control keypads for gaming and the like. Further, the microlens array of the present invention is implemented to the structure in the form of 1:1 matching pixels so that virtual display having high resolution can be provided.

Since the microlens array of the present invention is based on elastic and flexible materials, it can be also applied to a part of human body or a structure having curvatures and thus can be used to provide 3D images of wearable and skin patch-type displays.

The microlens array may be manufactured the following processes.

A method for fabricating the microlens array according to one embodiment of the present invention, includes: forming a lens structure part formed by bistable dielectric polymer thin film; forming first and second electrode parts on the upper surface and the bottom surface of the lens structure part, respectively to apply voltage for shape changes of the lens structure part; forming a circuit part on a part of the upper surface of the first electrode part or a part of the bottom surface of the second electrode part to apply heat to the dielectric polymer thin film; and forming a base part on the bottom surface of the second electrode in predetermined intervals to support the lens structure part.

In the forming the lens structure part, the lens structure part can be formed in a three-dimensional shape or a flat shape and the lens structure part can be formed by using a shape memory polymer.

The first and second electrode parts can be formed with one chosen from carbon nanotube, silver nanowire, graphene and Indium tin oxide (ITO).

If necessary, at least one of the first electrode part and the second electrode part can form a plurality of electrode parts by being patterned in a predetermined shape and each of the plurality of electrode parts can be applied with the same or different voltage to control the shape change of the lens structure part.

The method according to at least one embodiment may further include forming a hydraulic part on bottom surface of the structure on which the base part is formed to apply predetermined pressure to the bottom surface of the lens structure part.

The method according to at least one embodiment may further include a light source structure part on the bottom surface of the base part to irradiate light.

It is obvious that the method according to at least one embodiment may include all contents described above for the microlens array.

While it has been described with reference to particular embodiments, it is to be appreciated that various changes and modifications may be made by those skilled in the art without departing from the spirit and scope of the embodiment herein, as defined by the appended claims and their equivalents. Therefore, the particular embodiments described above are only for explanation and there is no intention to limit the invention. As such, many embodiments other than that set forth above can be found in the appended claims.

What is claimed is:

1. A microlens array comprising:
a lens structure part formed by bistable dielectric polymer thin film;
first and second electrode parts each formed on an uppermost surface and a bottommost surface of the lens structure part to apply voltage for shape changes of the lens structure part;
a circuit part applying heat to the dielectric polymer thin film to change the property of the dielectric polymer thin film to be soft; and
a base part formed on the bottom surface of the second electrode part in predetermined intervals to support the lens structure part,
wherein the uppermost surface of the lens structure part forms a plurality of outward curves and the bottommost surface of the lens structure part forms a plurality of inward curves each of which corresponds to each of the plurality of outward curves, such that the lens structure part forms a plurality of convex-concave lenses which include convex surfaces formed by the outward curves and concave surfaces formed by the inward curves,
wherein at least one of the first electrode part and the second electrode part includes a plurality of electrode parts which are disposed on a single outward curve of the plurality of outward curves or on a single inward curve of the plurality of inward curves,
wherein the plurality of electrode parts are apart from each other, forming an electrode area defined by the plurality of electrode parts and a no-electrode area defined by gaps between the plurality of electrode parts on the single outward curve or the single inward curve, and
wherein the circuit part is disposed on the uppermost surface of the lens structure at a joint region between two adjacent ones of the plurality of outward curves formed by the uppermost surface.

2. The microlens array according to claim 1, wherein the lens structure part is formed with a shape memory polymer.

3. The microlens array according to claim 1, wherein the first and second electrode parts are formed with one selected from the group consisting of carbon nanotube, silver nanowire, graphene and Indium tin oxide (ITO).

4. The microlens array according to claim 1, wherein degree of change in the lens structure part is controlled according to voltage magnitude applied through the first and second electrode parts.

5. The microlens array according to claim 1, wherein the plurality of electrode parts form a plurality of independent electrode parts, and different magnitudes of voltages are applied, respectively, to the plurality of the independent electrode parts disposed on the single outward curve or on the single inward curve.

6. A display device, comprising:
the microlens array of claim 1; and
a light source structure part coupled to a bottom surface of the base part to irradiate light to the lens structure part.

7. The display device according to claim 6, wherein the light source structure part comprises a light source irradiating the light, in which the light source is formed between the base part or on the bottom surface of the base part.

8. The display device according to claim 7, wherein the light source is formed on the bottom surface of the base part, and
wherein the light source structure part further comprises:
a micromirror formed between the base part; and
an optical waveguide forming a light transmitting path to transmit the light of the light source to the micromirror.

9. The microlens array according to claim 1, wherein the base part includes a plurality of base parts each of which is respectively disposed directly below all of joining region of the bottommost surface of the lens structure part at which two adjacent ones of the plurality of inward curves are joined together.

10. The microlens array according to claim 1, wherein:
the circuit part includes a plurality of circuit parts;
the joint region includes a plurality of join regions which are disposed between two respective adjacent ones of the plurality of outward curves formed by the uppermost surface,
the first electrode part includes junction portions which are disposed at a respective one of the plurality of joint regions; and
each of the plurality of circuit parts is disposed on and in contact with a respective one of the junction portions of the first electrode part.

11. A method for fabricating a microlens array, the method comprising:
forming a lens structure part formed by bistable dielectric polymer thin film;
forming first and second electrode parts on an uppermost surface and a bottommost surface of the lens structure part, respectively to apply voltage for shape changes of the lens structure part;
forming a circuit part on a part of the upper surface of the first electrode part to apply heat to the dielectric polymer thin film; and
forming a base part on the bottom surface of the second electrode part in predetermined intervals to support the lens structure part,
wherein the uppermost surface of the lens structure part forms a plurality of outward curves and the bottommost surface of the lens structure part forms a plurality of inward curves each of which corresponds to each of the plurality of outward curves, such that the lens structure part forms a plurality of convex-concave lenses which include convex surfaces formed by the outward curves and concave surfaces formed by the inward curves,
wherein at least one of the first electrode part and the second electrode part includes a plurality of electrode parts which are disposed on a single outward curve of the plurality of outward curves or on a single inward curve of the plurality of inward curves,
wherein the plurality of electrode parts are apart from each other, forming an electrode area defined by the plurality of electrode parts and a no-electrode area defined by gaps between the plurality of electrode parts on the single outward curve or the single inward curve, and
wherein the circuit part is disposed on the uppermost surface of the lens structure at a joint region between two adjacent ones of the plurality of outward curves formed by the uppermost surface.

12. The method according to claim 11, wherein in the step of forming the lens structure part, the lens structure part is formed in a three-dimensional shape or a flat shape.

13. The method according to claim 11, wherein in the forming the lens structure part, the lens structure part is formed by using a shape memory polymer.

14. The method according to claim 11, wherein the first and second electrode parts are formed with one selected from the group consisting of carbon nanotube, silver nanowire, graphene and Indium tin oxide (ITO).

15. The method according to claim 11, further comprising changing shape of the lens structure part by controlling a voltage magnitude applied through the first and second electrode parts.

16. The method according to claim 11, wherein the base part includes a plurality of base parts each of which is respectively disposed directly below all of joining region of the bottommost surface of the lens structure part at which two adjacent ones of the plurality of inward curves are joined together.

17. The method according to claim 11, wherein the plurality of electrode parts form a plurality of independent electrode parts, and different magnitudes of voltages are applied, respectively, to the plurality of the independent electrode parts disposed on the single outward curve or on the single inward curve.

18. A microlens array comprising:
a lens structure part formed by bistable dielectric polymer thin film;
a first electrode part formed on an uppermost surface of the lens structure part, and a second electrode part formed on a bottommost surface of the lens structure part, the first and second electrode parts applying voltage for shape changes of the lens structure part, the bottommost surface being apart from the uppermost surface by a thickness of the lens structure;
a circuit part applying heat to the dielectric polymer thin film to change the property of the dielectric polymer thin film to be soft; and
a base part formed on the bottom surface of the second electrode part in predetermined intervals to support the lens structure part,
wherein the uppermost surface of the lens structure part forms a plurality of outward curves and the bottommost surface of the lens structure part forms a plurality of inward curves,
wherein the lens structure extends in a width direction along which the plurality of outward curves are arranged side by side,
wherein the first electrode part extends along the width direction of the lens structure to be disposed on an entire width of the lens structure without discontinuity,
wherein: the first electrode part includes junction portions which are disposed on joint regions between two adjacent ones of the plurality of outward curves formed by the uppermost surface; and the circuit part includes joint portions which are disposed on and in contact with a respective one of the junction portions of the first electrode part.

* * * * *